(12) United States Patent
Alshinnawi et al.

(10) Patent No.: US 9,698,903 B2
(45) Date of Patent: Jul. 4, 2017

(54) CABLE HAVING A SPARE SIGNAL LINE FOR AUTOMATIC FAILURE RECOVERY

(71) Applicant: Lenovo Enterprise Solutions (Singapore) Pte. Ltd., Singapore (SG)

(72) Inventors: Shareef F. Alshinnawi, Apex, NC (US); Gary D. Cudak, Wake Forest, NC (US); Edward S. Suffern, Durham, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 195 days.

(21) Appl. No.: 14/750,369

(22) Filed: Jun. 25, 2015

(65) Prior Publication Data

US 2016/0380709 A1    Dec. 29, 2016

(51) Int. Cl.
| | |
|---|---|
| *H04B 10/077* | (2013.01) |
| *H04L 1/22* | (2006.01) |
| *H04B 10/032* | (2013.01) |
| *H04B 10/40* | (2013.01) |
| *H04B 3/46* | (2015.01) |

(52) U.S. Cl.
CPC .......... *H04B 10/0779* (2013.01); *H04B 3/46* (2013.01); *H04B 10/032* (2013.01); *H04B 10/40* (2013.01); *H04L 1/22* (2013.01)

(58) Field of Classification Search
CPC .... H04B 10/079; H04B 10/032; H04B 10/40; H04L 1/22
See application file for complete search history.

(56) References Cited

U.S. PATENT DOCUMENTS

| | | | | |
|---|---|---|---|---|
| 2012/0248287 | A1* | 10/2012 | Shukunami | H04B 10/032 250/205 |
| 2012/0278656 | A1* | 11/2012 | Berkhahn | H04L 12/40032 714/37 |
| 2015/0365317 | A1* | 12/2015 | Wang | G02B 6/268 398/16 |

* cited by examiner

*Primary Examiner* — Andrew Lai
*Assistant Examiner* — Sumitra Ganguly
(74) *Attorney, Agent, or Firm* — Jeffrey L. Streets

(57) ABSTRACT

A method and apparatus are provided for detecting and recovering from a damaged signal line in a communication cable. Signals are transmitted over a first plurality of signal lines within the cable from a first end, signals are transmitted over a second plurality of signal lines within the cable from the second end, and the quality of signals received on each of the first plurality of signal lines at the second end of the cable are monitored. A first one of the first plurality of signal lines that is not providing a signal of a predetermined minimum quality is identified, the identified first signal line is automatically switched out for a first spare signal line within the cable, and one of the second plurality of signal lines that is logically associated with the identified first signal line is automatically switched out for a second spare signal line within the cable.

18 Claims, 4 Drawing Sheets

CABLE HAVING A SPARE SIGNAL LINE FOR AUTOMATIC FAILURE RECOVERY

BACKGROUND

Field of the Invention

The present invention relates to cables for high-speed data communication between nodes, such as in a computer network.

Background of the Related Art

Datacenter environments including HPC, SAP HANA and Hyperscale computing configurations consist of hundreds to thousands of copper and fiber cables. Any of these cables can become defective due to mishandling, material deterioration and oxidation. Furthermore, poor soldering techniques can cause problems as the solder joint corrodes over time. These cables can be expensive and often need to be returned to the supplier for defect isolation. However, removal of a defective cable and reinstallation of a replacement cable can require a considerable amount of time, especially when dealing with longer cable runs.

In a datacenter having a large number of cables, the cables are often run overhead or below the floor in large cable bundles. Any specific cable can become buried under other cables and may be intertwined with those cables making it very difficult to remove a specific cable and install a replacement cable. If the cables run through or around obstructions and confined spaces, this will increase the amount of time spent handling the cables and increase the potential for damaging other cables or cable connections within the datacenter. Furthermore, the amount of time that a cable remains out of service may represent downtime for one or more component or service of the datacenter.

BRIEF SUMMARY

One embodiment of the present invention provides an apparatus, comprising a cable having a first end, a second end, a first plurality of signal lines, a second plurality of signal lines, a first spare signal line and a second spare signal line, wherein each of the signal lines extend from the first end to the second end. The apparatus further comprises a first connector having a plurality of data transmit lines and a plurality of data receive lines, wherein each data transmit line is logically associated with one of the data receive lines, and wherein the first connector is adapted for communication with an input output bus of a first node. Still further, the apparatus comprises a first plurality of switches each having a first connection permanently coupled to one of the data transmit lines and a second connection selectively coupled either to one the first plurality of signal lines or the first spare signal line, and a second plurality of switches each having a first connection permanently coupled to one or the data receive lines and a second connection selectively coupled either to one of the second plurality of signal lines or the second spare signal line. In addition, the apparatus comprises a first signal detector coupled to each of the data receive lines, wherein the first signal detector has an output identifying one of the data receive lines that is not receiving a signal of at least a predetermined minimum quality, and wherein the output of the first signal detector is coupled to the first and second plurality of switches to cause a first one of the second plurality of switches to selectively couple the identified data receive line to the first spare signal line and to cause a first one of the first plurality of switches to selectively couple one of the data transmit lines logically associated with the identified data receive line to the second spare signal line.

Another embodiment of the present invention provides a method, comprising connecting a first end of a cable to a first node and a second end of the cable to a second node, wherein the cable includes a first plurality of signal lines, a second plurality of signal lines, a first spare signal line and a second spare signal line, and wherein each of the first plurality of signal lines is logically associated with one of the second plurality of signal lines. The method further comprises transmitting signals over the first plurality of signal lines from the first node to the second node, transmitting signals over the second plurality of signal lines from the second node to the first node, and monitoring quality of a signal received from the first node on each of the first plurality of signal lines at the second end of the cable. Still further, the method comprises identifying a first one of the first plurality of signal lines that is not providing a signal of at least a predetermined minimum quality, automatically switching out the identified first signal line for the first spare signal line, and automatically switching out one of the second plurality of signal lines that is logically associated with the identified first signal line for the second spare signal line.

DETAILED DESCRIPTION

Figure 1:
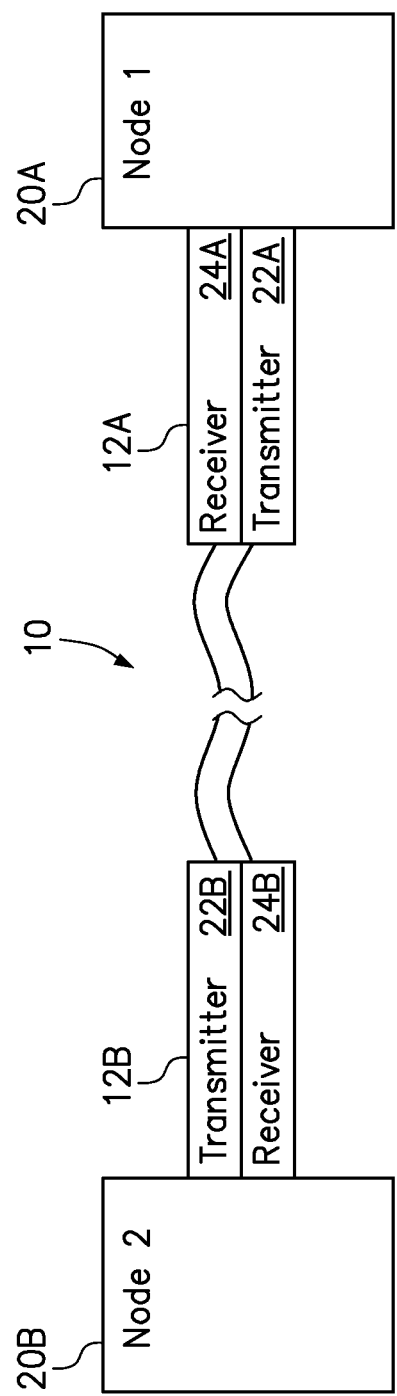
FIG. 1 is a diagram a cable extending between two nodes.

One embodiment of the present invention provides an apparatus, comprising a cable having a first end, a second end, a first plurality of signal lines, a second plurality of signal lines, a first spare signal line and a second spare signal line, wherein each of the signal lines extend from the first end to the second end. The apparatus further comprises a first connector having a plurality of data transmit lines and a plurality of data receive lines, wherein each data transmit line is logically associated with one of the data receive lines, and wherein the first connector is adapted for communication with an input output bus of a first node. Still further, the apparatus comprises a first plurality of switches each having a first connection permanently coupled to one of the data transmit lines and a second connection selectively coupled either to one the first plurality of signal lines or the first spare signal line, and a second plurality of switches each having a first connection permanently coupled to one of the data receive lines and a second connection selectively coupled either to one of the second plurality of signal lines or the second spare signal line. In addition, the apparatus comprises a first signal detector coupled to each of the data receive lines, wherein the first signal detector has an output identifying one of the data receive lines that is not receiving a signal of at least a predetermined minimum quality, and wherein the output of the first signal detector is coupled to the first and second plurality of switches to cause a first one of the second plurality of switches to selectively couple the identified data receive line to the first spare signal line and to cause a first one of the first plurality of switches to selectively couple one of the data transmit lines logically associated with the identified data receive line to the second spare signal line.

The cable, such as an Ethernet cable or an Infiniband cable, is suitable for digital communications between first and second nodes independently selected from a compute node and a network switch. The cable may be, without limitation, 10 GBase T with Cat6 cables and OM3 Fiber both used for 10 Gb E, Cat5 and Cat 6 cables used in 1 Gb E applications. In addition, the cable may be either a passive copper cable or an active optical cable. The connector may be a cable connector for securing to a port of a node or the connector may be a network adapter card connector for securing in a card slot of a node. Optionally, the cable may further include a nonvolatile memory device for storing vital product data.

Embodiments of the apparatus may include a transmitter coupled to the first subset of signal lines for transmitting signals onto the cable, and a receiver coupled to the second subset of signal lines for receiving signals over the cable. The transmitter and receiver may be on either side of the plurality of switches, which may be provided by a crosspoint switch. For example, one embodiment of a cable with signal lines made with copper wire has a transmitter and receiver disposed between an input output bus of a node and the plurality of switches. Optionally, the transmitter, receiver, switches and signal detector are included in a network interface card. In an alternative example, another embodiment of a cable with optical fiber signal lines has a transmitter and receiver disposed between the cable stock and the plurality of switches. Optionally, the transmitter, receiver, switches and signal detector are included in a cable connector secured to one end of the cable. In all of the embodiments, the components are preferably the same at each end of the cable with the provision that the transmitter at a first end of the cable communicates over a first plurality of signal lines to the receiver at the second end of the cable, and the transmitter at a second end of the cable communicates over a second plurality of signal lines to the receiver at the first end of the cable.

The apparatus preferably further comprises a second connector having a plurality of data transmit lines and a plurality of data receive lines, wherein each data transmit line is logically associated with one of the data receive lines, and wherein the second connector is adapted for communication with an input output bus of a second node. The apparatus may further comprise a third plurality of switches each having a first connection permanently coupled to one of the data transmit lines and a second connection selectively coupled either to one the first plurality of signal lines or the first spare signal line, and a fourth plurality of switches each having a first connection permanently coupled to one or the data receive lines and a second connection selectively coupled either to one of the second plurality of signal lines or the second spare signal line. Still further, the apparatus may comprise a second signal detector coupled to each of the data receive lines, wherein the second signal detector has an output identifying one of the data receive lines that is not receiving a signal of at least a predetermined minimum quality, and wherein the output of the second signal detector is coupled to the third and fourth plurality of switches to cause a first one of the fourth plurality of switches to selectively couple the identified data receive line to the first spare signal line and to cause a first one of the third plurality of switches to selectively couple one of the data transmit lines logically associated with the identified data receive line to the second spare signal line. Accordingly, the signal lines, plurality of switches, signal detector and interconnecting circuits are preferably the same at each end of the cable, other than the fact that data is transmitted in one direction with a first plurality of signal lines and transmitted in the opposite direction with a second plurality of signal lines.

Another embodiment of the present invention provides a method, comprising connecting a first end of a cable to a first node and a second end of the cable to a second node, wherein the cable includes a first plurality of signal lines, a second plurality of signal lines, a first spare signal line and a second spare signal line, and wherein each of the first plurality of signal lines is logically associated with one of the second plurality of signal lines. The method further comprises transmitting signals over the first plurality of signal lines from the first node to the second node, transmitting signals over the second plurality of signal lines from the second node to the first node, and monitoring quality of a signal received from the first node on each of the first plurality of signal lines at the second end of the cable. Still further, the method comprises identifying a first one of the first plurality of signal lines that is not providing a signal of at least a predetermined minimum quality, automatically switching out the identified first signal line for the first spare signal line, and automatically switching out one of the second plurality of signal lines that is logically associated with the identified first signal line for the second spare signal line.

Optionally, the steps of automatically switching out the identified first signal line for the first spare signal line and automatically switching out one of the second plurality of signal lines that is logically associated with the identified first signal line for the second spare signal line, may be further defined to include additional specific steps. In one embodiment, those steps include switching a second end of the identified first signal line for a second end of the first spare signal line, and switching a second end of the one of the second plurality of signal lines that is logically associated with the identified first signal line for a second end of the second spare signal line. With the second ends of the spare signal lines switched, additional steps may switch the first sends of the spare signal lines. Accordingly, the steps may further include monitoring quality of a signal received from the second node on each of the second plurality of signal lines at the first end of the cable, identifying a second one of the second plurality of signal lines that is not providing a signal of at least a predetermined minimum quality, switching a first end of the identified second signal line for a first end of the second spare signal line, and switching a first end of one of the first plurality of signal lines that is logically associated with the identified second signal line for a first end of the first spare signal line.

Embodiments of the method may further comprise validating a signal received from the first node on the first spare signal line at the second end of the cable, and validating a signal received from the second node on the second spare signal line at the first end of the cable. Once the spare signal lines have been validated, the full function of the cable has been restored.

Further embodiments of the method may further comprise filtering the signals received from the first node on each of the first plurality of signal lines at the second end of the cable prior to identifying the first signal line that is not providing a signal of at least a predetermined minimum quality, and filtering the signals received from the second node on each of the second plurality of signal lines at the first end of the cable prior to identifying the second signal line that is not providing a signal of at least a predetermined minimum quality. In this manner, it is the quality of the filtered or conditioned signal from the signal lines that determines whether to switch to the spare signal lines.

Embodiments of the present invention include a cable with logic at both ends of the cable capable of interpreting signal quality and detecting errors and then taking corrective action by switching out the defective line with a spare line and validating the issue is resolved. By including error detection and recovery capabilities and enabling a cable to switch from a defective line to an unused operational spare line within the cable, the physical activity of replacing the cable can be greatly reduced if not eliminated. Continued used of the existing cable saves time and eliminates the possibility of inducing additional damage to other cables while removing the defective cable and installing a new cable. Therefore, the cable also provides enhanced up-time capabilities without the need for redundant connections that use multiple switch ports.

It should be recognized that the apparatus and methods of the present invention may involve any number of spare signal lines. For example, networks having a high quality-of-service or uptime requirement may use cables having more than two spare signal lines, or more than two spare pair of signal lines.

FIG. 1 is a diagram a cable 10 extending between two nodes. The cable has a first end 12A coupled to a first node 20A and a second end 12B coupled to a second node 20B. In the illustration of FIG. 1, the first end 12A includes a transmitter 22A and a receiver 24A, while the second end 12B includes a transmitter 22B and a receiver 24B. As will be shown later, the transmitters and receivers may be part of the cable or part of a network interface card installed in each node. In either instance, the cable 10 will include a number of signal lines, such as copper wires or optical fibers, which extend from the first end 12A to the second end 12B. Accordingly, the cable 10 includes a first plurality of signal lines facilitating communication from the first transmitter 22A to the second receiver 24B and a second plurality of signal lines facilitating communication from the second transmitter 22B to the first receiver 24A. The cable 10 will further include a first spare signal line and a second spare signal line as shown in FIGS. 2 and 3.

Figure 2:
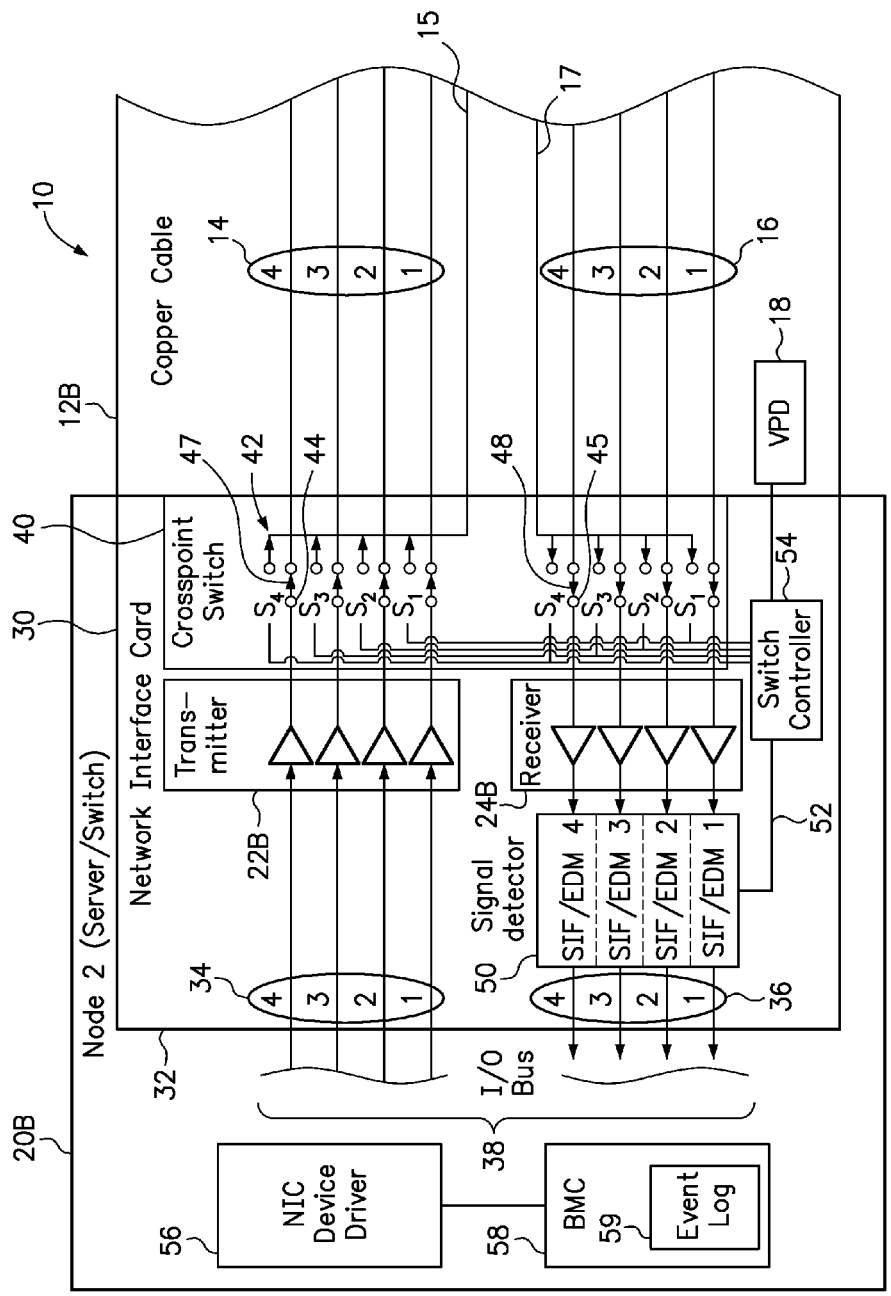
FIG. 2 is a diagram of one end of the cable and the second node according to a first embodiment of the present invention, wherein the cable includes copper wire signal lines and aspects of the invention are incorporated into a network interface card.
Figure 3:
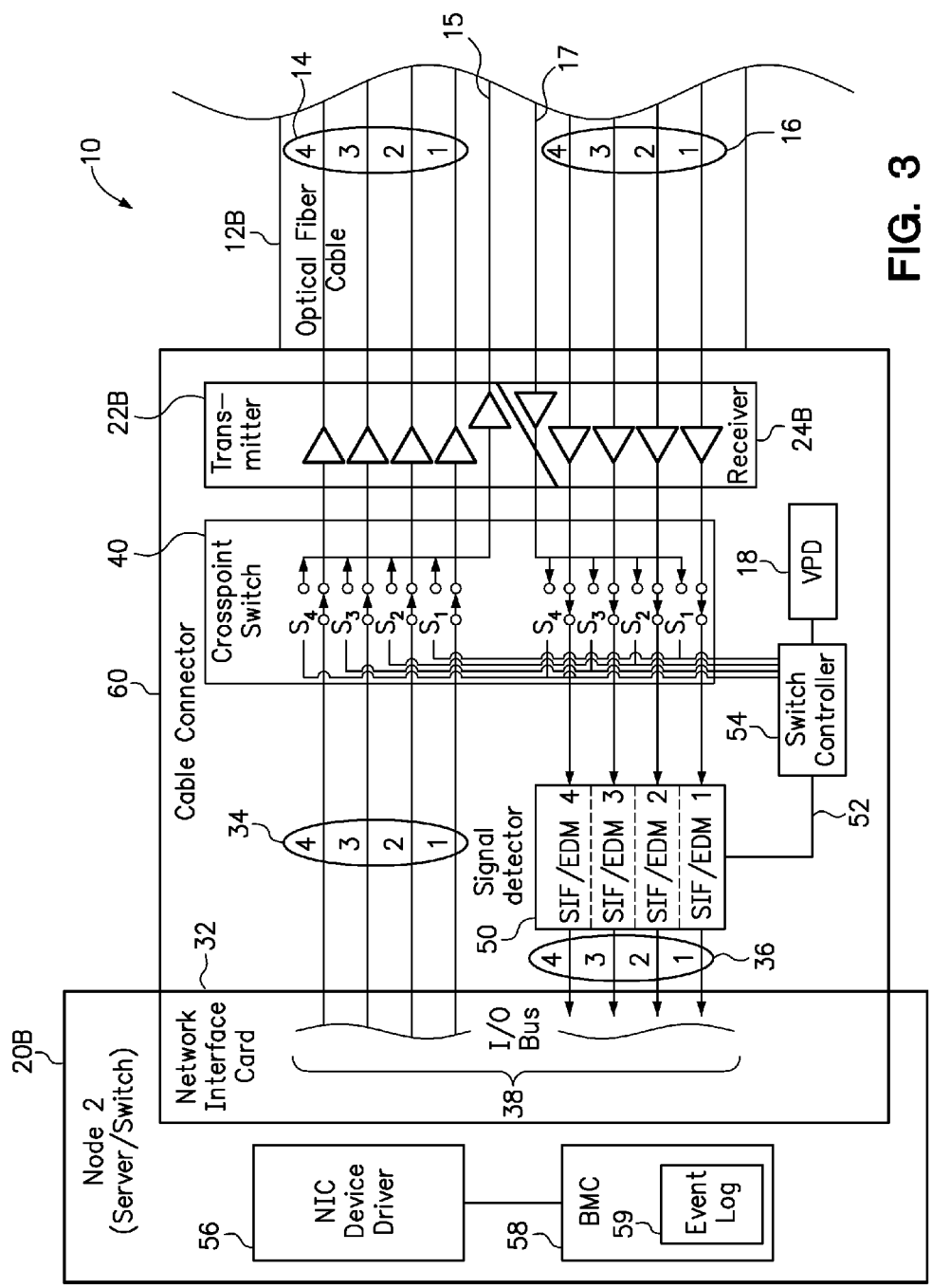
FIG. 3 is a diagram of one end of the cable and the second node according to a second embodiment of the present invention, wherein the cable includes optical fiber signal lines and aspects of the invention are incorporated into a cable connector.

FIG. 2 is a diagram of the second end of the cable 10 and the second node 20B according to a first embodiment of the present invention wherein the cable includes copper wire signal lines and aspects of the invention are incorporated into a network interface card. It should be understood that the first end of the cable will connect with the first node (see FIG. 1) via another network interface card consistent with FIG. 2. The cable 10 includes a first plurality of signal lines 16, a second plurality of signal lines 14, a first spare signal line 17, and a second spare signal line 15.

In the embodiment shown, the network interface card 30 has a connector 32 having a plurality of data transmit lines 34 and a plurality of data receive lines 36, wherein each data transmit line 34 is logically associated with one of the data receive lines 36. As shown, there are four data transmit lines 34 and four data receive lines 36, where each set of lines are numbered 1-4 to illustrate a logical association between lines with the same number. Accordingly, data transmit line 1 may be considered to be logically associated with data receive line 1, and each other data transmit line may be similarly considered to be logically associated with a data receive line with a similar number. The plurality of data transmit lines 34 and the plurality of data receive lines 36 are adapted for communication with an input output bus 38 of the second node 20B.

The network interface card 30 includes a crosspoint switch 40 that provides a plurality of switches 42. In the embodiment shown, the crosspoint switch 40 provides a total of eight switches 42, including two sets of four switches 42. One set of four switches each have a first connection 44 coupled to one of the plurality of data transmit lines 34 and a second connection 47 that is selectively coupled either to one the second plurality of signal lines 14 or the second spare signal line 15. One set of four switches each have a first connection 44 coupled to one of the plurality of data transmit lines 34 and a second connection 47 that is selectively coupled either to one the second plurality of signal lines 14 or the second spare signal line 15. Another set of four switches each have a first connection 45 coupled to one of the plurality of data receive lines 36 and a second connection 48 that is selectively coupled either to one the first plurality of signal lines 16 or the first spare signal line 17.

A signal detector 50, such as a Signal Integrity Filter (SIF) and Error Detection Module (EDM), is coupled to each of the data receive lines 36 and has an output 52 identifying one of the data receive lines that is not receiving a signal of at least a predetermined minimum quality. As shown, the output 52 from the first signal detector 50 is provided to a switch controller 54 that is coupled to control the first and second plurality of switches 42 of the crosspoint switch 40. Accordingly, the switch controller 54 responds to the output 52 to cause a first one of the second plurality of switches to selectively couple the identified data receive line 36 to the first spare signal line 17 and to cause a first one of the first plurality of switches to selectively couple one of the data transmit lines 34, which is logically associated with the identified data receive line 36, to the second spare signal line 15. For example, the switch controller 54 is illustrated with four signal integrity lines, where each signal integrity line extends to a pair of logically associated switches including one switch connected to a data receive line 36 and one switch connected to a data transmit line 34. Accordingly, the switch controller 54 may activate any pair of switches ($S_1$, $S_2$, $S_3$ or $S_4$) to switch over to the spare signal lines 15, 17.

The detector 50 may include a series of filters to optimize the signal recovery by the receiver. These filters may contain three to five stages of filtering and wave shaping. Ideally, the signal was originally transmitted as a differential square wave. One conductor of a twisted pair contains a negative going part of the square wave and the other conductor contains the positive going signal. Transmitting a differential signal allows the receiver to cancel out any noise that is added by the cable, e.g. electro-static interference. The stages of the detector filters may contain operational amplifiers and bandpass filters that allow only the desired frequencies to be amplified. The ideal signal at the output of the filter stages is the same square wave that was transmitted at the opposing transmitter. Once optimized by the detector filters, the clean signal is sent to the I/O bus. If the detector filters are unsuccessful in tuning the signal to an acceptable signal quality level, errors occur and retransmission is necessary causing latency issues.

If the detector is unable to detect a logical "1" or a "0" signal on a particular signal line, either because there is no signal or because the filter section cannot "clean up" the signal sufficiently, then the signal line has a problem. In one option, the detector determines that a signal line has a problem in response to the detector being unable to detect a signal during a sliding window of time during which all the three other detectors are detecting a good signal. In response to determining that a given signal line has a problem, the switch controller will switch from the twisted pair having the problem to a spare twisted pair. In another option, a "problem" may be detected when a bit error rate exceeds a setpoint.

Whether or not the spare signal lines are in use, the network interface card 30 inputs signals to the I/O bus 38 on the same four data receive lines 36 and output signals from the I/O bus 38 on the same four data transmit lines 34. The switches are arranged to switch out any pair of the signal lines in the cable 10 for the spare pair of signal lines 17, 15. Accordingly, when the signal detector 50 determines that a signal received on a particular one of the first plurality of signal lines 16 is no longer a good signal, that particular signal line 16 is automatically switched out in favor of the first spare signal line 17. Furthermore, a particular one of the second plurality of signal lines 14, which is logically associated with the particular signal line 16 no longer receiving a good signal, is also automatically switched out in favor of the second spare signal line 15.

When one of the signal lines 14 (for example, signal line 3) that is transmitting a signal to the first end of the cable is switched to the second spare signal line 15, the receiver 24A (see FIG. 1) at the first end will no longer receive a good signal on that signal line 14 (in this example, signal line 3). As shown at the second end 12B of the cable 10, the first end 12A of the cable includes the same components and circuit, such that a signal detector identifies the bad signal line and controls a switch in order to switch the bad signal line for the spare signal line 15 and the logically associated signal line for the other spare signal line 17. Accordingly, a signal detector at either end of the cable may initiate a change-over from a bad signal line pair to the spare signal line pair, and the circuit at the opposing end will, in the same manner, automatically switch over to the spare signal line pair. The circuits at each end would then validate the signal through the spare signal line of the cable. Once the signal on the spare signal line has been determined to be of an acceptable quality level, such as through detecting good signal quality as described above or achieving a bit error rate below a threshold, then the cable issue has been resolved.

The I/O bus 38 is in communication with a network interface card (NIC) device driver, which may be part of the operating system running on the node 20B. In various embodiments, the NIC device driver 56 may notify or report to a baseboard management controller (BMC) 58 about the loss of a good signal on one of the signal lines. Accordingly, the BMC may store the notification in an event log 59 and/or forward the notification to a datacenter management module (not shown).

Still further, the cable may include non-volatile memory, such as an electronically erasable programmable read only memory (EEPROM), which may be referred to as vital product data (VPD) 18. With a copper cable, the NIC may cause an indication of a bad signal line to be stored in the VPD. Furthermore, the NIC device driver may poll the cable VPD data periodically, such that the switch port location or a network adapter port location can be logged as an event for replacement consideration during a scheduled maintenance activity.

In one specific example, four twisted pairs are used to transmit a 10 Gbps Ethernet signal. Each pair transmits a signal at 2.5 Gbps. The receiver takes the four 2.5 Gbps signals and concatenates them to form a 10 Gbps signal. The same technology is used in higher speed Ethernet, e.g. 100 Gbps Ethernet contains four times 25 Gbps. The same is true for Infiniband. The Fourteen Data Rate (FDR) Infiniband contains four twisted pairs transmitting at 14 Gbps to form a concatenated signal that runs at 56 Gbps. However, if one twisted pair breaks or is damaged because the bend radius is exceeded, the entire cable is useless.

FIG. 3 is a diagram of one end of the cable and the second node according to a second embodiment of the present invention, wherein the cable 10 includes optical fiber signal lines and aspects of the invention are incorporated into a cable connector 60. It should be understood that the first end 12A of the cable 10 will connect with the first node 20A (see FIG. 1) via another cable connector consistent with FIG. 3. While like components in FIG. 3 operate in the same manner as in FIG. 2, the transmitter 22B and the receiver 24B of the second node 20B are disposed on the signal lines between the cable 10 and the crosspoint switch 40 so that the crosspoint switch 40 handles the electronic signal before it is converted to an optical signal for transmission or after the optical signal is received and converted to an electronic signal. Furthermore, the transmitter 22B includes an extra transmitter laser element (such as a vertical-cavity surface-emitting laser (VCSEL)) for the spare signal line 15 and the receiver 24B includes an extra photodetector receiver for the spare signal line 17.

Figure 4:
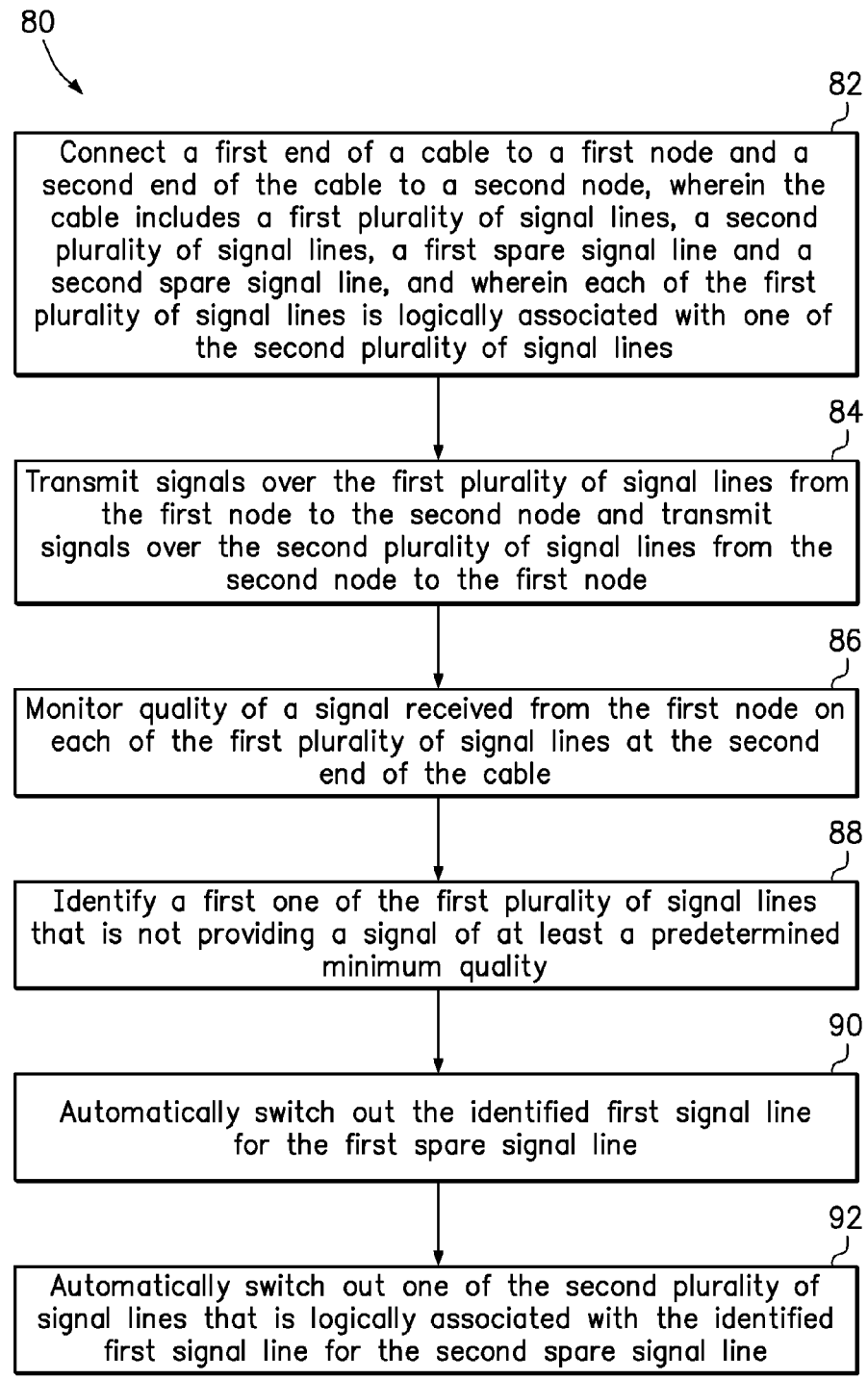
FIG. 4 is a flowchart of a method in accordance with an embodiment of the present invention.

FIG. 4 is a flowchart of a method 80 in accordance with an embodiment of the present invention. Step 82 connects a first end of a cable to a first node and a second end of the cable to a second node, wherein the cable includes a first plurality of signal lines, a second plurality of signal lines, a first spare signal line and a second spare signal line, and wherein each of the first plurality of signal lines is logically associated with one of the second plurality of signal lines. Step 84 transmits signals over the first plurality of signal lines from the first node to the second node and transmits signals over the second plurality of signal lines from the second node to the first node. Step 86 includes monitoring quality of a signal received from the first node on each of the first plurality of signal lines at the second end of the cable. In step 88, the method identifies a first one of the first plurality of signal lines that is not providing a signal of at least a predetermined minimum quality. Then, step 90 automatically switches out the identified first signal line for the first spare signal line, and step 92 automatically switches out one of the second plurality of signal lines that is logically associated with the identified first signal line for the second spare signal line.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   a cable having a first end, a second end, a first plurality of signal lines, a second plurality of signal lines, a first spare signal line and a second spare signal line, wherein each of the signal lines extend from the first end to the second end;
   a first connector having a plurality of data transmit lines and a plurality of data receive lines, wherein each of the plurality of data transmit lines of the first connector is logically associated with one of the plurality of data receive lines of the first connector, and wherein the first connector is adapted for communication with an input output bus of a first node;
   a first plurality of switches each having a first connection permanently coupled to one of the plurality of data transmit lines of the first connector and a second connection selectively coupled either to one of the first plurality of signal lines or the first spare signal line;
   a second plurality of switches each having a first connection permanently coupled to one of the plurality of data receive lines of the first connector and a second connection selectively coupled either to one of the second plurality of signal lines or the second spare signal line; and
   a first signal detector coupled to each of the plurality of data receive lines, wherein the first signal detector has an output identifying one of the plurality of data receive lines of the first connector not receiving a signal of at least a predetermined minimum quality, and wherein the output of the first signal detector is coupled to the first and the second plurality of switches to cause a first one of the second plurality of switches to selectively couple the identified data receive line of the first connector to the first spare signal line and to cause a first one of the first plurality of switches to selectively couple one of the plurality of data transmit lines of the first connector logically associated with the identified data receive line of the first connector to the second spare signal line.

2. The apparatus of claim 1, further comprising:
   a transmitter coupled to the first plurality of signal lines for transmitting signals onto the cable; and
   a receiver coupled to the second plurality of signal lines for receiving signals over the cable.

3. The apparatus of claim 1, wherein the switch is a crosspoint switch.

4. The apparatus of claim 1, further comprising:
   a nonvolatile memory device for storing vital product data.

5. The apparatus of claim 1, further comprising:
   a second connector having a plurality of data transmit lines and a plurality of data receive lines, wherein each of the plurality of data transmit lines of the second connector is logically associated with one of the plurality of data receive lines of the second connector, and wherein the second connector is adapted for communication with an input output bus of a second node;
   a third plurality of switches each having a first connection permanently coupled to one of the plurality of data transmit lines of the second connector and a second connection selectively coupled either to one of the first plurality of signal lines or the first spare signal line;
   a fourth plurality of switches each having a first connection permanently coupled to one of the plurality of data receive lines of the second connector and a second connection selectively coupled either to one of the second plurality of signal lines or the second spare signal line; and
   a second signal detector coupled to each of the plurality of data receive lines of the second connector, wherein the second signal detector has an output identifying one of the plurality of data receive lines of the second connector not receiving a signal of at least a predetermined minimum quality, and wherein the output of the second signal detector is coupled to the third and the fourth plurality of switches to cause a first one of the fourth plurality of switches to selectively couple the identified data receive line of the second connector to the first spare signal line and to cause a first one of the third plurality of switches to selectively couple one of the plurality of data transmit lines of the second connector logically associated with the identified data receive line of the second connector to the second spare signal line.

6. The apparatus of claim 5, wherein the first and the second nodes are independently selected from a compute node and a network switch.

7. The apparatus of claim 1, wherein the cable is an Ethernet cable or an Infiniband cable.

8. The apparatus of claim 1, wherein the signal lines are conductive metal signal lines, and wherein the switches and the signal detectors are included in network interface cards.

9. The apparatus of claim 1, wherein the signal lines are optical fiber signal lines, and wherein the switches and the signal detectors are included in cable connectors secured to the cable.

10. A method, comprising:
    connecting a first end of a cable to a first node and a second end of the cable to a second node, wherein the cable includes a first plurality of signal lines, a second plurality of signal lines, a first spare signal line and a second spare signal line, and wherein each of the first plurality of signal lines is logically associated with one of the second plurality of signal lines;
    transmitting signals over the first plurality of signal lines from the first node to the second node and transmitting signals over the second plurality of signal lines from the second node to the first node;
    monitoring quality of a signal received from the first node on each of the first plurality of signal lines at the second end of the cable;
    identifying a first one of the first plurality of signal lines not providing a signal of at least a predetermined minimum quality;
    automatically switching the identified first signal line for the first spare signal line; and
    automatically switching one of the second plurality of signal lines logically associated with the identified first signal line for the second spare signal line.

11. The method of claim 10, wherein the steps of automatically switching the identified first signal line for the first spare signal line and automatically switching one of the second plurality of signal lines logically associated with the identified first signal line for the second spare signal line, include:
    switching a second end of the identified first signal line for a second end of the first spare signal line;
    switching a second end of the one of the second plurality of signal lines logically associated with the identified first signal line for a second end of the second spare signal line;

monitoring quality of a signal received from the second node on each of the second plurality of signal lines at the first end of the cable;
identifying a second one of the second plurality of signal lines not providing a signal of at least a predetermined minimum quality;
switching a first end of the identified second signal line for a first end of the second spare signal line; and
switching a first end of one of the first plurality of signal lines logically associated with the identified second signal line for a first end of the first spare signal line.

12. The method of claim 11, further comprising:
validating a signal received from the first node on the first spare signal line at the second end of the cable; and
validating a signal received from the second node on the second spare signal line at the first end of the cable.

13. The method of claim 10, further comprising:
filtering the signals received from the first node on each of the first plurality of signal lines at the second end of the cable prior to identifying the first signal line not providing a signal of at least a predetermined minimum quality; and
filtering the signals received from the second node on each of the second plurality of signal lines at the first end of the cable prior to identifying the second signal line not providing a signal of at least a predetermined minimum quality.

14. The method of claim 10, wherein the transmitted signal is a differential signal.

15. The method of claim 10, further comprising:
notifying a management entity that the cable is using the first and the second spare signal lines.

16. The method of claim 10, further comprising:
storing the identity of the identified first signal line in a nonvolatile memory on the cable.

17. The apparatus of claim 10, wherein the first and the second nodes are independently selected from a compute node and a network switch.

18. The apparatus of claim 10, wherein the cable is an Ethernet cable or an Infiniband cable.

* * * * *